（12）United States Patent
Oelmaier

(10) Patent No.: US 7,696,645 B2
(45) Date of Patent: Apr. 13, 2010

(54) CIRCUIT ARRANGEMENT FOR VOLTAGE SWITCHING

(75) Inventor: Reinhard Oelmaier, Laupheim (DE)

(73) Assignee: Atmel Automotive GmbH, Heilbronn (DE)

(*) Notice: Subject to any disclaimer, the term of this patent is extended or adjusted under 35 U.S.C. 154(b) by 384 days.

(21) Appl. No.: 11/850,655

(22) Filed: Sep. 5, 2007

(65) Prior Publication Data

US 2008/0084119 A1    Apr. 10, 2008

Related U.S. Application Data

(60) Provisional application No. 60/842,132, filed on Sep. 5, 2006.

(51) Int. Cl.
*H01H 19/64*    (2006.01)

(52) U.S. Cl. .................................................. 307/113
(58) Field of Classification Search .................. 307/113
See application file for complete search history.

(56) References Cited

U.S. PATENT DOCUMENTS 6,917,082 B1 *   7/2005   Loo ........................... 257/368

* cited by examiner

*Primary Examiner*—Robert L. DeBeradinis
(74) *Attorney, Agent, or Firm*—Muncy, Geissler, Olds & Lowe, PLLC

(57) ABSTRACT

A circuit arrangement for voltage switching is used for optimized control of switching transistors, which are used for switching voltages applied to an output of the circuit arrangement. The circuit arrangement of the invention enables rapid voltage switching with a simultaneously low current consumption.

7 Claims, 3 Drawing Sheets

CIRCUIT ARRANGEMENT FOR VOLTAGE SWITCHING

This nonprovisional application claims priority to U.S. Provisional Application No. 60/842,132, which was filed on Sep. 5, 2006, and is herein incorporated by reference.

BACKGROUND OF THE INVENTION

1. Field of the Invention

The present invention relates to a voltage arrangement for voltage switching with low current consumption.

2. Description of the Background Art

Battery-buffered systems typically have available a main voltage supply, which is used to supply energy to the system during normal operation. The main voltage supply can be fed, for example, by a line voltage or by means of a vehicle on-board electrical system. If the main voltage supply fails, for example, when the system is separated from the line voltage or from the vehicle on-board electrical system, typically a battery takes over the voltage supply to the system or to parts of the system.

For dynamic voltage switching between the voltage supplied by the main voltage supply and the battery-supplied voltage, typically switches are used for voltage switching, which have a first input terminal for connecting the voltage supplied by the main voltage supply and a second input terminal to connect the battery-supplied voltage. Either the voltage supplied by the main voltage supply or the battery-supplied voltage is provided at an output terminal of the switches for voltage switching, depending on the level of the voltage supplied by the main voltage supply. To this end, the voltage supplied by the main voltage supply is monitored with use of a voltage monitor, which causes a switching of the voltage at the output of the voltage arrangement with an appropriate output signal.

SUMMARY OF THE INVENTION

It is therefore an object of the present invention to provide a circuit arrangement for voltage switching of the aforementioned type, which has the lowest possible current consumption under all operating conditions and which enables safe and rapid voltage switching.

The circuit arrangement of the invention for voltage switching comprises a first input terminal to connect a first voltage, for example, a voltage supplied by a main voltage supply, and a second input terminal to connect a second voltage, which is made available, for example, by a battery. An output terminal is used to output either the first voltage or the second voltage to supply a downstream system. A first switching transistor is looped between the first input terminal and the output terminal and a second switching transistor is looped between the second input terminal and the output terminal. The switching transistors are used for alternative switching through either the first or the second voltage. A voltage monitor with an input terminal and an output terminal is used to monitor the first voltage, whereby the input terminal of the voltage monitor is connected to the first input terminal of the circuit arrangement or the first voltage and a monitoring signal, dependent on the first voltage, is output at the output terminal of the voltage monitor. A resistor, a third transistor, and a fourth transistor are looped in series, but not necessarily in this sequence, between the second input terminal and a reference potential, whereby a control terminal of the third transistor and a control terminal of the fourth transistor are connected to the output terminal of the voltage monitor. The resistor, the third transistor, and the fourth transistor are used for inverting the monitoring signal output by the voltage monitor and for level adjustment. A first inverter of the circuit arrangement comprises an input terminal and an output terminal, whereby the input terminal of the first inverter is connected to a connecting node of the third transistor and of the fourth transistor and the first inverter is supplied by the second voltage. A fifth transistor, a sixth transistor, and a seventh transistor are looped in series, but not necessarily in this sequence, between the second input terminal and the reference potential, whereby a control terminal of the sixth transistor and a control terminal of the seventh transistor are connected to the output terminal of the voltage monitor, a control terminal of the fifth transistor is connected to the output terminal of the first inverter, and a control terminal of the first switching transistor is connected to a connection node of the sixth transistor and of the seventh transistor. A second inverter of the circuit arrangement comprises an input terminal and an output terminal, whereby the input terminal of the second inverter is connected to the connection node of the sixth transistor and of the seventh transistor, a control terminal of the second switching transistor is connected to the output terminal of the second inverter, and the second inverter is supplied by the first or second voltage via decoupling diodes.

In a further embodiment, the first switching transistor is a PMOS transistor, whose drain-source path is looped between the first input terminal and the output terminal and whose gate terminal is connected to the connection node of the sixth transistor and of the seventh transistor.

In a further embodiment, the second switching transistor is a PMOS transistor, whose drain-source path is looped between the second input terminal and the output terminal and whose gate terminal is connected to the output terminal of the second inverter.

In a further embodiment, the third transistor is a PMOS transistor and the fourth transistor an NMOS transistor, whereby the gate terminal of the third transistor and the gate terminal of the fourth transistor are connected to the output terminal of the voltage monitor.

In a further embodiment, the resistor is connected to a terminal with the second voltage, and the drain-source path of the third transistor and the drain-source path of the fourth transistor are looped in series between the other terminal of the resistor and the reference potential.

In a further embodiment, the third transistor is connected to a terminal of its drain-source path with the second voltage, the fourth transistor is connected to a terminal of its drain-source path with the reference potential, and the resistor is looped between the other terminal of the drain-source path of the third transistor and the other terminal of the drain-source path of the fourth transistor.

In a further embodiment, the fifth transistor and the sixth transistor are PMOS transistors and the seventh transistor is an NMOS transistor, whereby the drain-source path of the fifth transistor, the drain-source path of the sixth transistor, and the drain-source path of the seventh transistor, but not necessarily in this sequence, are looped in series between the second voltage and the reference potential, the gate terminal of the fifth transistor is connected to the output terminal of the first inverter, and the gate terminal of the sixth transistor and the gate terminal of the seventh transistor are connected to the output terminal of the voltage monitor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
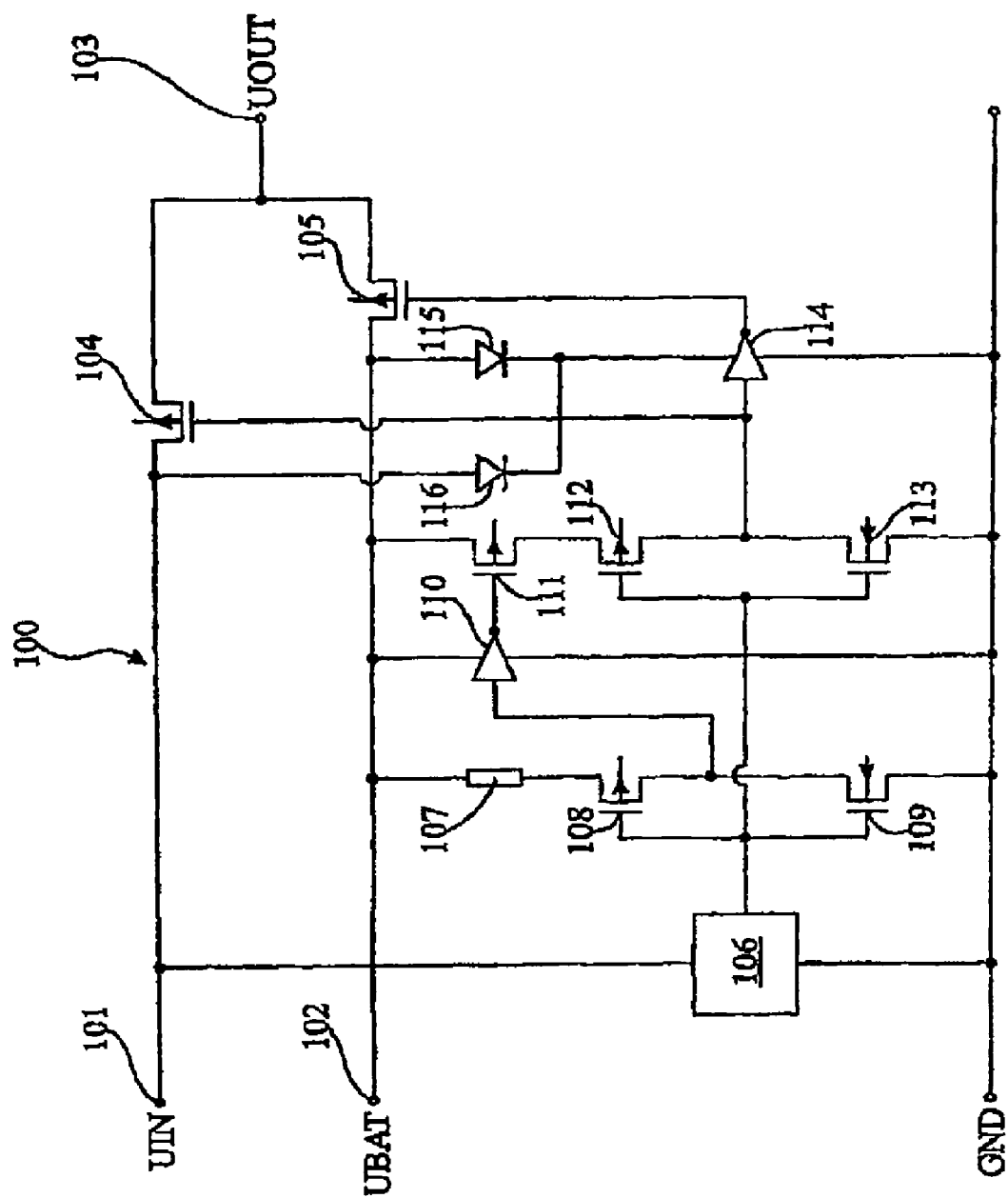
FIG. 1 is a circuit diagram of a first circuit arrangement of the invention for voltage switching.

FIG. 1 shows a circuit diagram of a circuit arrangement 100 of the invention for voltage switching. The circuit arrangement comprises a first input terminal 101 to connect a first voltage UIN, for example, a voltage supplied by a main voltage supply (not shown), and a second input terminal 102 to connect a second voltage UBAT, which is made available, for example, by a battery (not shown).

An output terminal 103 is used to output either the first voltage UIN or the second voltage UBAT as an output voltage UOUT to supply downstream circuit parts, which are not shown.

A PMOS switching transistor 104 is looped with its drain-source path between first input terminal 101 and output terminal 103, and a PMOS switching transistor 105 is looped with its drain-source path between second input terminal 102 and output terminal 103. PMOS switching transistors 104 and 105 are used for alternative or alternate switching through either the first or the second voltage UIN or UBAT.

A voltage monitor 106 with an input terminal and an output terminal is used to monitor the first voltage UIN, whereby the input terminal of voltage monitor 106 is connected to first input terminal 101 of circuit arrangement 100 or the first voltage UIN, and a monitoring signal, dependent on the first voltage UIN, is output at the output terminal of voltage monitor 106.

A resistor 107, a drain-source path of a PMOS transistor 108, and a drain-source path of an NMOS transistor 109 are looped in series, in this sequence, between second input terminal 102 and a reference potential in form of the ground potential GND. A gate terminal of PMOS transistor 108 and a gate terminal of NMOS transistor 109 are connected to the output terminal of voltage monitor 106. Resistor 107, PMOS transistor 108, and NMOS transistor 108 are used for inverting the monitoring signal output by voltage monitor 106 and for level adjustment.

A first inverter 110 comprises an input terminal and an output terminal, whereby the input terminal of first inverter 110 is connected to a connecting node of PMOS transistor 108 and NMOS transistor 109, and first inverter 110 is supplied by the second voltage UBAT.

A PMOS transistor 111, a PMOS transistor 112, and an NMOS transistor 113 are looped in series, in this sequence, with their respective drain-source paths between second input terminal 102 and ground potential GND, whereby a gate terminal of PMOS transistor 112 and a gate terminal of NMOS transistor 113 are connected to the output terminal of voltage monitor 106, a gate terminal of PMOS transistor 111 is connected to the output terminal of first inverter 110, and a gate terminal of first switching transistor 104 is connected to a connection node of PMOS transistor 112 and NMOS transistor 113.

A second inverter 114 comprises an input terminal and an output terminal, whereby the input terminal is connected to the connection node of PMOS transistor 112 and NMOS transistor 113, a gate terminal of second switching transistor 105 is connected to the output terminal of second inverter 114, and second inverter 114 is supplied via decoupling diodes 115 and 116 by the first voltage UIN or the second voltage UBAT, depending on which of the two voltages UIN or UBAT is higher.

The function of circuit arrangement 100 of FIG. 1 is described in greater detail hereafter. The first voltage UIN, if present, is typically within a voltage range of about 2.3 V to 3.6 V. The first voltage UIN is typically supplied by a main voltage supply (not shown), for example, by a vehicle on-board electrical system. The second voltage UBAT, supplied by a battery (not shown), presuming a functional battery, is typically within a range of 1.5 V to 3.6 V. A switching threshold of the voltage monitor 106 is, for example, about 1.5 V.

When the first voltage UIN is greater than the switching threshold of voltage monitor 106, i.e., greater than about 1.5 V, voltage monitor 106 supplies a high signal, whose level is slightly lower than the first voltage UIN. The high signal is applied at the respective gate terminals of transistors 108 and 109, as a result of which NMOS transistor 109 is switched through and PMOS transistor 108 is blocked. When the second voltage UBAT, however, is considerably higher than the first voltage UIN, this produces a resulting gate-source voltage at PMOS transistor 108, as a result of which this transistor is not completely blocked. This in turn produces a so-called cross current across resistor 107, PMOS transistor 108, and NMOS transistor 109, which leads to an unwanted discharge of the battery with an applied first main supply voltage UIN. To minimize this cross current, resistor 107 is dimensioned as high impedance.

Because NMOS transistor 109 switches through, the potential at a connection node of transistors 108 and 109 is pulled to ground, as a result of which the ground potential is applied at the input of first inverter 110. As a result, the inverter generates about the battery voltage UBAT at its output terminal, because it is supplied by this voltage. Because the output signal of first inverter 110 is applied at the gate terminal of PMOS transistor 111, transistor 111 blocks and prevents a cross current from the battery through transistors 111, 112, and 113.

The high signal of voltage monitor 106 is also applied at the respective gate terminals of transistors 112 and 113, as a result of which NMOS transistor 113 is switched through and PMOS transistor 112 is blocked. This has the result that a potential at the connection node of transistors 112 and 113 is pulled to ground, as a result of which switching transistor 104 is switched through; i.e., the first voltage or the main supply voltage UIN is switched through at output 103.

Second inverter 114 inverts the ground potential applied at its input, so that a high level is applied at its output. The voltage level actually output depends on which of the two voltages UIN or UBAT is higher, because second inverter 114 is supplied with the higher of the two voltages because of decoupling diodes 115 and 116. The high level applied at the output of inverter 114 has the result that switching transistor 105 blocks, so that the second voltage or the battery voltage UBAT is not switched through at output 103.

When the voltage UIN is less than the switching threshold of voltage monitor 106, i.e., less than about 1.5 V, voltage monitor 106 supplies a low signal, i.e., about the ground voltage level. The low signal is applied at the respective gate terminals of transistors 108 and 109, as a result of which NMOS transistor 109 blocks and PMOS transistor 108 switches through.

Because PMOS transistor 108 switches through, the second voltage UBAT is applied at about the connection node of transistors 108 and 109, as a result of which the voltage UBAT is applied at the input of first inverter 110. The inverter consequently generates a low level or the ground potential at its output terminal. Because the output signal of first inverter 110 is applied at the gate terminal of PMOS transistor 111, PMOS transistor 111 conducts.

The low signal of voltage monitor 106 is also applied at the respective gate terminals of transistors 112 and 113, as a result of which NMOS transistor 113 blocks and PMOS transistor 112 conducts. This has the result that the second voltage UBAT is applied about at the connection node of transistors 112 and 113, as a result of which switching transistor 104 blocks; i.e., the first voltage or the main supply voltage UIN is not switched through at output 103.

Second inverter 114 inverts the signal with the high level applied at its input, so that a low level is applied at its output. The low level applied at the output of inverter 114 has the result that switching transistor 105 conducts, so that the second voltage or the battery voltage UBAT is switched through at output 103.

In summary, circuit arrangement 100 for voltage switching of FIG. 1, depending on the level of the first voltage or the main supply voltage UIN, switches through either the first voltage UIN or the second voltage UBAT at its output 103.

A cross current across transistors 108 and 109, when the battery voltage UBAT is substantially higher than the main supply voltage UIN, is substantially prevented by the suitably dimensioned resistor 107. Inverter 110 in conjunction with the PMOS transistor 111, controlled by it, enables rapid switching of the output voltage to the battery voltage UBAT, i.e., rapid blocking of switching transistor 104.

In this type of switching process, a gate capacitor (not shown) of switching transistor 104 is rapidly charged to cause blocking of switching transistor 104. The charging current necessary for this can flow from the battery via the low-impedance path of switched-through transistors 111 and 112 to the gate capacitor of switching transistor 104.

The shown circuit arrangement thus enables rapid switching of the voltages applied at output 103 and simultaneously has a low current consumption from the battery when the main supply voltage is applied at the output.

Figure 2:
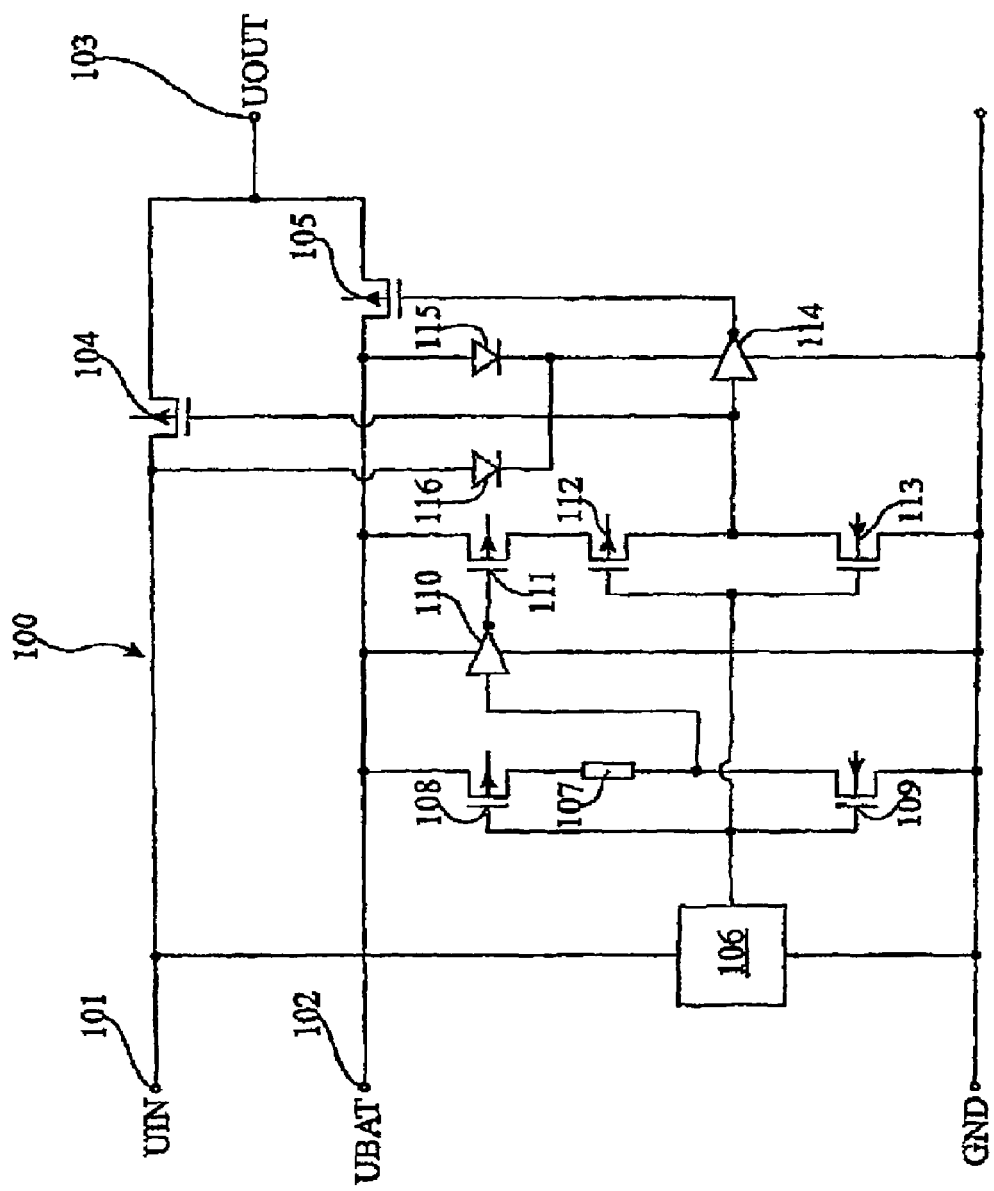
FIG. 2 is a circuit diagram of another circuit arrangement of the invention for voltage switching.

FIG. 2 shows a circuit diagram of another circuit arrangement of the invention for voltage switching. Elements, which correspond to the elements shown in FIG. 1, are provided with identical reference characters. In the embodiment shown in FIG. 2, the placement of resistor 107 and transistor 108 is exchanged; i.e., the drain-source path of transistor 108 is looped between the second input voltage UBAT and resistor 107. The function of the embodiment shown in FIG. 2 corresponds otherwise to the embodiment shown in FIG. 1.

Figure 3:
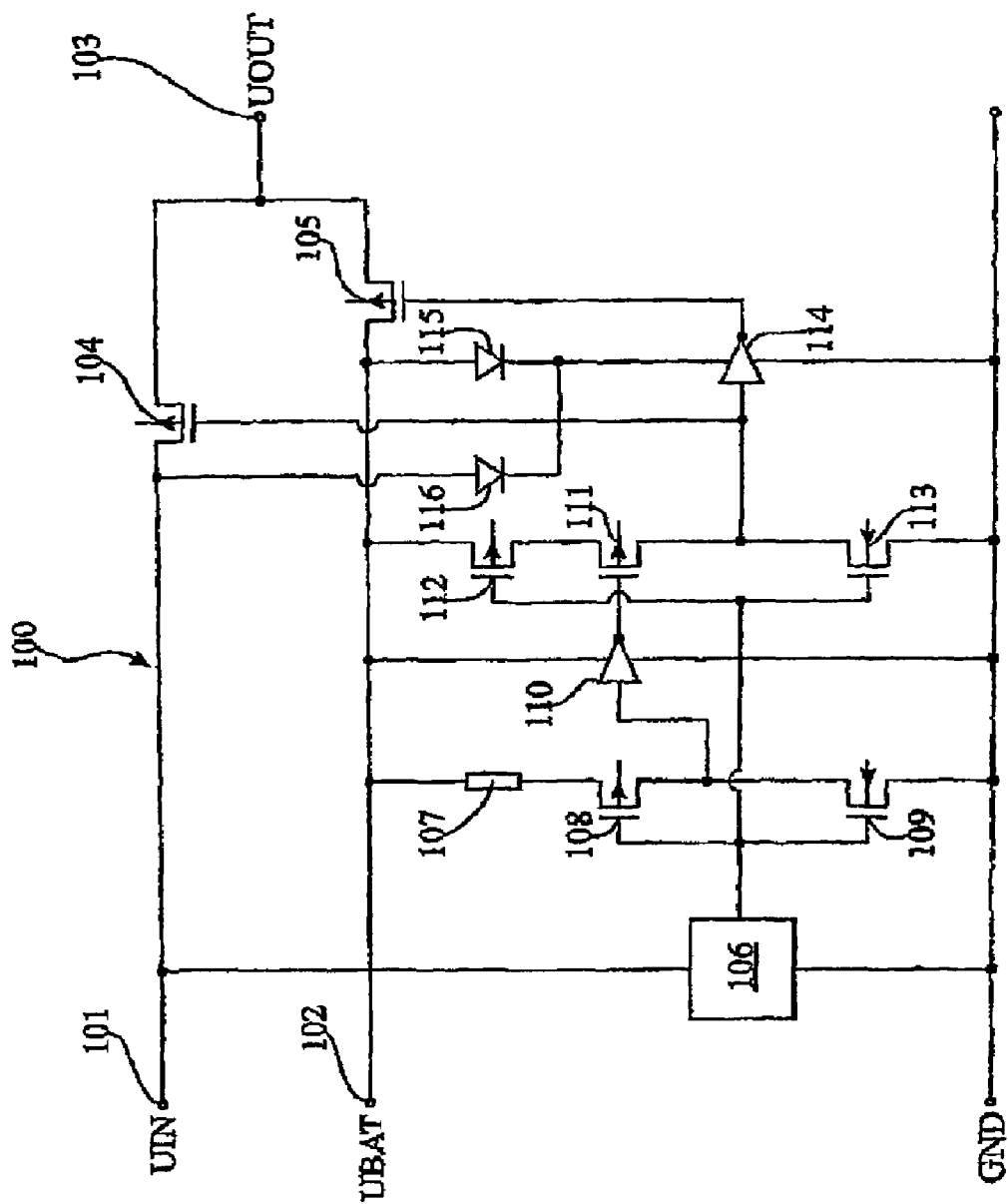
FIG. 3 is a circuit diagram of another circuit arrangement of the invention for voltage switching.

FIG. 3 shows a circuit diagram of another circuit arrangement of the invention for voltage switching. Elements, which correspond to the elements shown in FIG. 1, are provided with identical reference characters. In the embodiment shown in FIG. 3, the placement of transistors 111 and 112 within the cross path, formed by transistors 111, 112, and 113, is exchanged. The function of the embodiment shown in FIG. 3 corresponds otherwise to the embodiment shown in FIG. 1.

It is understood that the invention comprises conventional circuitry measures, such as the replacement of PMOS transistors by NMOS transistors, etc.

The shown circuit arrangement for voltage switching may be used particularly for battery-supported applications, for example, for mobile battery-operated global positioning systems.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit arrangement for voltage switching, the circuit arrangement comprising:
    a first input terminal for connecting a first voltage;
    a second input terminal for connecting a second voltage;
    an output terminal for outputting either the first voltage or the second voltage;
    a first switching transistor, which is looped between the first input terminal and the output terminal;
    a second switching transistor, which is looped between the second input terminal and the output terminal;
    a voltage monitor with an input terminal and an output terminal, the input terminal of the voltage monitor being connected to the first input terminal of the circuit arrangement and a monitoring signal, dependent on the first voltage, is output at the output terminal of the voltage monitor;
    a resistor, a third transistor, and a fourth transistor, which are looped in series between the second input terminal and a reference potential, a control terminal of the third transistor and a control terminal of the fourth transistor being connected to the output terminal of the voltage monitor;
    a first inverter with an input terminal and an output terminal, the input terminal of the first inverter being connected to a connection node of the third transistor and the fourth transistor, and the first inverter being supplied by the second voltage;
    a fifth transistor, a sixth transistor, and a seventh transistor, which are looped in series between the second input terminal and the reference potential, a control terminal of the sixth transistor and a control terminal of the seventh transistor being connected to the output terminal of the voltage monitor, a control terminal of the fifth transistor being connected to the output terminal of the first inverter, and a control terminal of the first switching transistor being connected to a connection node of the sixth transistor and the seventh transistor; and
    a second inverter being connected to an input terminal and an output terminal, the input terminal of the second inverter being connected to the connection node of the sixth transistor and the seventh transistor, a control terminal of the second switching transistor being connected to the output terminal of the second inverter, and the second inverter being supplied via decoupling diodes by the first or by the second voltage.

2. A circuit arrangement according to claim 1, wherein the first switching transistor is a PMOS transistor, whose drain-source path is looped between the first input terminal and the output terminal and whose gate terminal is connected to the connection node of the sixth transistor and the seventh transistor.

3. A circuit arrangement according to claim 1, wherein the second switching transistor is a PMOS transistor, whose drain-source path is looped between the second input terminal and the output terminal and whose gate terminal is connected to the connection node of the second inverter.

4. A circuit arrangement according to claim 1, wherein the third transistor is a PMOS transistor and the fourth transistor is an NMOS transistor, wherein the gate terminal of the third transistor and the gate terminal of the fourth transistor are connected to the output terminal of the voltage monitor.

5. A circuit arrangement according to claim 4, wherein the resistor is connected to a terminal with the second voltage, and the drain-source path of the third transistor and the drain-source path of the fourth transistor are looped in series between the other terminal of the resistor and the reference potential.

6. A circuit arrangement according to claim 4, wherein the third transistor is connected to a terminal of its drain-source path with the second voltage, the fourth transistor is connected to a terminal of its drain-source path with the reference potential, and the resistor is looped between the other terminal of the drain-source path of the third transistor and the other terminal of the drain-source path of the fourth transistor.

7. A circuit arrangement according to claim 1, wherein the fifth transistor and the sixth transistor are PMOS transistors and the seventh transistor is an NMOS transistor, whereby the drain-source path of the fifth transistor, the drain-source path of the sixth transistor, and the drain-source path of the seventh transistor are looped in series between the second voltage and the reference potential, the gate terminal of the fifth transistor is connected to the output terminal of the first inverter, and the gate terminal of the sixth transistor and the gate terminal of the seventh transistor are connected to the output terminal of the voltage monitor.

* * * * *